(12) United States Patent
Gray

(10) Patent No.: US 10,256,676 B2
(45) Date of Patent: Apr. 9, 2019

(54) SYSTEMS AND METHODS FOR INDUCTIVELY COUPLED POWER TRANSFER AND BIDIRECTIONAL COMMUNICATION

(71) Applicant: Cameron International Corporation, Houston, TX (US)

(72) Inventor: Conor Gray, Moyne (IE)

(73) Assignee: Cameron International Corporation, Houston, TX (US)

( * ) Notice: Subject to any disclaimer, the term of this patent is extended or adjusted under 35 U.S.C. 154(b) by 249 days.

(21) Appl. No.: 15/224,001

(22) Filed: Jul. 29, 2016

(65) Prior Publication Data

US 2017/0033604 A1    Feb. 2, 2017

Related U.S. Application Data

(60) Provisional application No. 62/199,757, filed on Jul. 31, 2015.

(51) Int. Cl.
| | |
|---|---|
| *H01F 27/42* | (2006.01) |
| *H01F 37/00* | (2006.01) |
| *H01F 38/00* | (2006.01) |
| *H02J 50/80* | (2016.01) |
| *H02J 50/12* | (2016.01) |

(52) U.S. Cl.
CPC .............. *H02J 50/80* (2016.02); *H02J 50/12* (2016.02)

(58) Field of Classification Search
CPC .................................. H02J 50/80; H02J 50/12
See application file for complete search history.

(56) References Cited

U.S. PATENT DOCUMENTS

| | | | |
|---|---|---|---|
| 5,455,466 A | 10/1995 | Parks et al. | |
| 2004/0136207 A1* | 7/2004 | Havanur | H02M 3/33592 363/21.06 |
| 2006/0017403 A1* | 1/2006 | Matsushima | H05B 41/2827 315/291 |
| 2009/0184582 A1* | 7/2009 | Hwang | H02M 1/10 307/64 |
| 2011/0254377 A1 | 10/2011 | Wildmer et al. | |

(Continued)

FOREIGN PATENT DOCUMENTS

WO    2012092177    7/2012

OTHER PUBLICATIONS

International Search Report and Written Opinion of PCT Application No. PCT/US2016/044840 dated Oct. 21, 2016: pp. 1-12.

*Primary Examiner* — Alfonso Perez Borroto
*Assistant Examiner* — Esayas G Yeshaw
(74) *Attorney, Agent, or Firm* — Chamberlain Hrdlicka

(57) ABSTRACT

A method of wireless power transfer includes providing a primary rail voltage to a primary coil via a primary transistor network, driving the primary transistor network with a primary PWM signal, inducing a secondary current on a secondary coil, providing a secondary rail voltage to a load via a secondary transistor network, generating a voltage signal from the secondary current via a current sense amplifier, phase-locking the voltage signal to the secondary current, adjusting a phase shift and amplitude of the voltage signal based on the impedance of the load, thereby generating a driving voltage, converting the driving voltage to a secondary PWM signal, and driving the secondary transistor network with the PWM signal.

20 Claims, 6 Drawing Sheets

(56) References Cited

U.S. PATENT DOCUMENTS

| | | | |
|---|---|---|---|
| 2012/0085176 A1* | 4/2012 | Morales | G01B 7/18 |
| | | | 73/773 |
| 2012/0326773 A1 | 12/2012 | Posat et al. | |
| 2013/0181539 A1 | 7/2013 | Muratov et al. | |
| 2014/0346967 A1* | 11/2014 | McDougle | H05B 37/02 |
| | | | 315/239 |
| 2014/0368056 A1 | 12/2014 | Hosotani | |
| 2015/0241485 A1* | 8/2015 | Salewski | G01R 21/133 |
| | | | 324/114 |
| 2015/0372598 A1* | 12/2015 | Akiyama | H02M 3/285 |
| | | | 363/17 |

* cited by examiner

SYSTEMS AND METHODS FOR INDUCTIVELY COUPLED POWER TRANSFER AND BIDIRECTIONAL COMMUNICATION

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Wireless power transfer is used to provide power from a power source to a load in which the load and the power source are not connected by any wires. In some cases, a physical barrier is disposed between the power source and the load. For example, the power source and the load can be separately packaged in respective housings. Generally, wireless power transmission systems include a primary side which is physically coupled to the power supply, and a secondary side which is physically coupled to the load. The primary side includes a primary transformer coil which generates an electromagnetic field. The electromagnetic field induces a current on a secondary transformer coil coupled to the secondary side. Thus, the secondary side and the load are powered.

However, in some applications, a barrier is disposed between the primary transformer coil and the secondary transformer coil, which contributes to losses in power transfer efficiency. For example, eddy currents induced in the barrier will decrease the amount of power transferred from the primary side to the secondary side. In some cases, the barrier may account for about 70% of the power loss between the power source and the load. Thus, it is desired to reduce the amount of power loss due to the barrier.

BRIEF DESCRIPTION OF THE DRAWINGS

Illustrative embodiments of the present disclosure are described in detail below with reference to the attached drawing figures, which are incorporated by reference herein and wherein.

Figure 1:
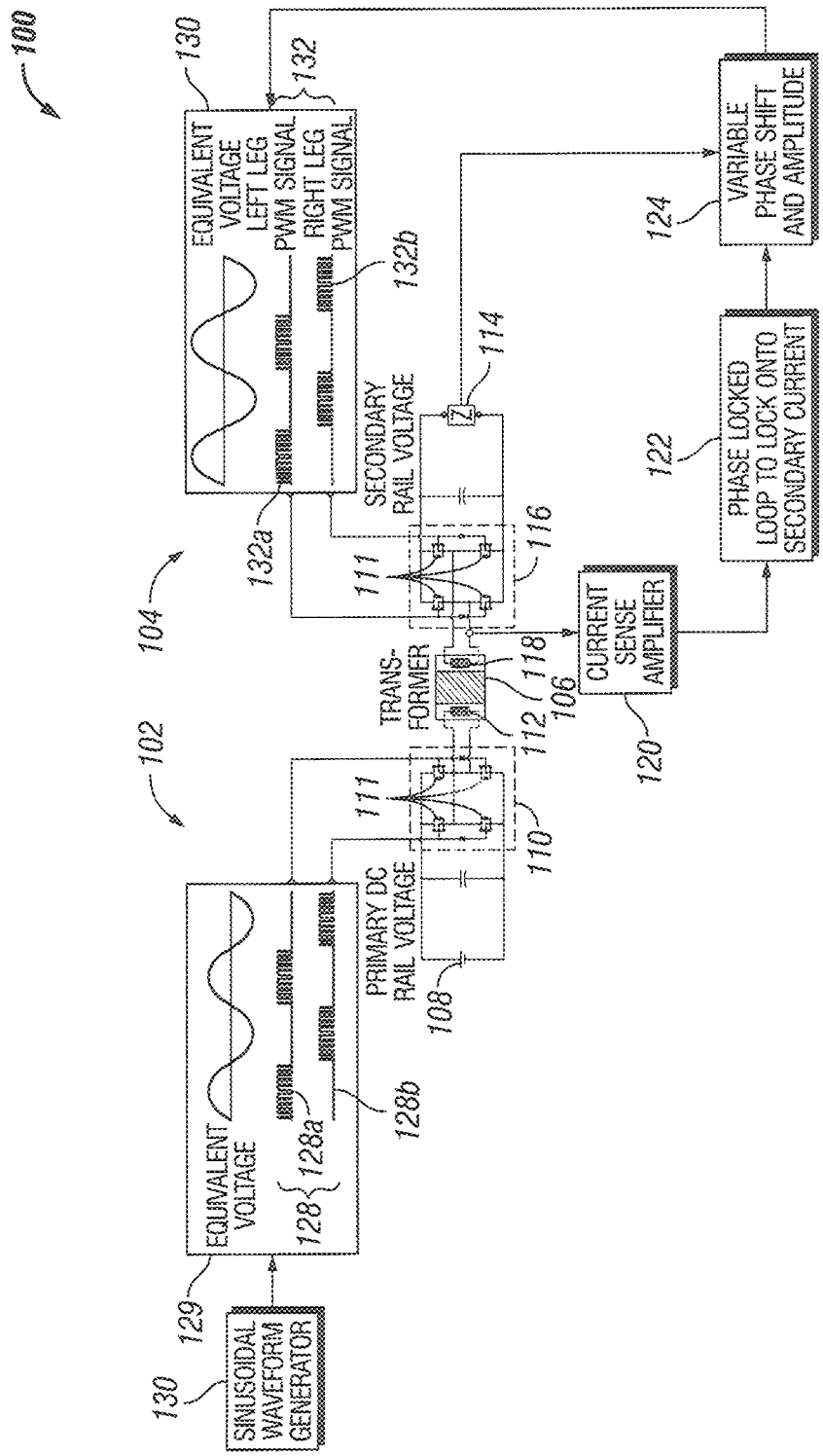
FIG. 1 illustrates a schematic diagram of a power transfer system, in accordance with embodiments of the present disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Terms are used throughout the following description and claims to refer to particular features or components. As one skilled in the art will appreciate, different persons may refer to the same feature or component by different names. This document does not intend to distinguish between components or features that differ in name but are the same structure or function.

Throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

The present disclosure is directed towards methods and systems of wireless power transfer across a metal barrier which minimizes power losses due to Eddy currents generated in the metal barrier during power transfer. Some embodiments of the disclosed techniques include synchronizing the current on a secondary side of a transformer to the current on the primary side of the transformer, thereby minimizing changes in magnetic flux in the barrier. Thus, power losses due to Eddy currents in the barrier are minimized and overall power transfer efficiency is increased. In some cases, the power transfer efficiency can be increased from around 10% to around 60%.

Referring to the drawings, FIG. 1 illustrates a schematic diagram of a power transfer system 100, in accordance with embodiments of the present disclosure. In some example embodiments, the power transfer system 100 includes a primary side 102 and a secondary side 104. In some embodiments, the primary side 102 is coupled to a power supply 108 and includes a transistor network 110 and a primary coil 112. The primary coil 112 is configured to receive a primary DC rail voltage from the power supply 108 via the transistor network 110 which generates a pulse width modulation synthesized sine wave voltage which generates a primary current flowing through the primary coil 112. In some embodiments, the transistor network 110 controls power delivery from the power supply 108 across the primary coil 112. In some embodiments, the transistor network 110 includes one or more transistors 111 or gates, such as a field-effect transistor (FET). In some embodiments, as illustrated in FIG. 1, the transistor network 110 forms an H-bridge. In other embodiments, the transistor network 110 may include various other circuit elements and devices. In some embodiments, the transistor network 110 can be an integrated circuit (IC) or built from discrete components.

In some embodiments, switching of the transistor network 110 is controlled by a pulse-width modulation (PWM) signal 128. In some embodiments, the PWM signal 128 is generated from a sinusoidal waveform 129 from a sinusoidal waveform generator 130. In some embodiments, the PWM signal 128 includes a left-leg PWM signal 128b and a right-leg PWM signal 128a. The left-leg PWM signal 128b represents the positive half of the sinusoidal waveform 129, and the right-leg PWM signal 128a represents the value of the negative half of the sinusoidal waveform 129. In certain such embodiments, the left-leg PWM signal 128b is fed into the left side of the H-bridge 110 and the right-leg PWM signal 128a is fed into the right side of the H-bridge 110. Specifically, the left-leg PWM signal 128b is fed into the gates of the transistors 111 on the left side of the H-bridge 110 and the right-leg PWM signal 128a is fed into the gates of the transistors 111 on the right side of the H-bridge. Thus, the a rail voltage is provided from the power supply 108 to the primary coil based on the switching scheme of the transistor network 110 as determined by the PWM signal 128. A corresponding current flowing through the primary coil generates a magnetic field.

The secondary side 104 includes a secondary coil 118, a secondary transistor network 116, and a load 114. The general purpose of the system 100 is to transfer power from the power supply on the primary side to the load 114 on the secondary side via inductive coupling through the primary and secondary coils 112, 118. In some example applications, the power is to be transferred from the primary side 102 to the secondary side 104 through a barrier 106 disposed therebetween. Specifically, the magnetic field generated by the primary coil 112 is picked up by the secondary coil 118 and induces a secondary current in the secondary coil 118.

In some embodiments, the load 114 receives a secondary rail voltage from the secondary coil 118 via the secondary transistor network 116. In some embodiments, the transistor network 116 can include one or more transistors 111 or gates and form various types of switches, rectifiers, and the like. For example, in certain embodiments, the secondary transistor network 116 is a full-wave rectifier which converts the secondary current, which is an alternating current as induced by the electromagnetic field generated by the primary coil, into a direct current to be supplied to the load 114. The load 114 may include any electronic components on the secondary side 104 which consume power, such as controllers, sensors, communication devices, and the like.

In some example embodiments, the secondary side 104 includes a current sense amplifier 120 which receives the secondary current. The current sense amplifier 120 is configured to generate a voltage signal from the secondary current. In some embodiments, the secondary side 104 further includes a phase-locked loop circuit 122 which receives the voltage signal and phase-locks the voltage signal to the secondary current such that the phase of the voltage signal is kept the same as the phase of the secondary current. In some embodiments, the secondary side 104 includes a phase shift and amplitude adjustment module 124 configured to apply a phase shift and/or amplitude adjustment to the voltage signal. In some embodiments, the phase shift and amplitude are adjusted based on the impedance of the load 114, which increases the efficiency of power transfer through the primary coil 112 and secondary coil 118.

In some embodiments, the voltage signal, having undergone phase-locking, phase shift, and amplitude adjustment, becomes a secondary sinusoidal waveform 130. A PWM signal 132 is generated from the secondary sinusoidal waveform 130 and used to drive the secondary transistor network 116. Thus, the secondary side 104 is driven synchronously with the primary side 102, which maximizes power transfer efficiency between the primary side 102 and the secondary side 104 through the barrier 106. Specifically, the barrier 106 traditionally accounts for a significant amount of power losses due to Eddy currents in the barrier 106.

When the primary coil 112 generates a magnetic field due to the sinusoidal current flowing therethrough, the barrier 106 experiences a corresponding magnetic flux. Thus, when a synchronized sinusoidal current is driven through the secondary coil 118, the magnetic field generated by the secondary coil 118 minimizes the magnetic flux in the barrier 106. In some embodiments, when the secondary coil 118 is driven synchronously with the primary coil 112, the electromagnetic field generated by the secondary coil 118 induces a magnetic flux in the barrier 106 that at least partially cancels out the magnetic flux induced by the primary coil 116. The total change in magnetic flux experienced in the barrier 106 is minimized, thereby minimizing power losses due to Eddy currents. Thus, power is more efficiently transferred from the primary side 102 to the secondary side 104 through the barrier. In some embodiments, the primary side current and the secondary side current are almost 180 degrees out of phase, which allows the flux created by the secondary side 104 to at least partially cancel out the flux created by the primary side.

In some embodiments, the barrier 106 is constructed from a metal material, and may constitute a portion of a tool housing or a sealed device. In some other embodiments, the barrier 106 can be constructed from other materials. The technique provided in this disclosure can be implemented in such embodiments, with results varying depending on the properties of the material.

Figure 2:
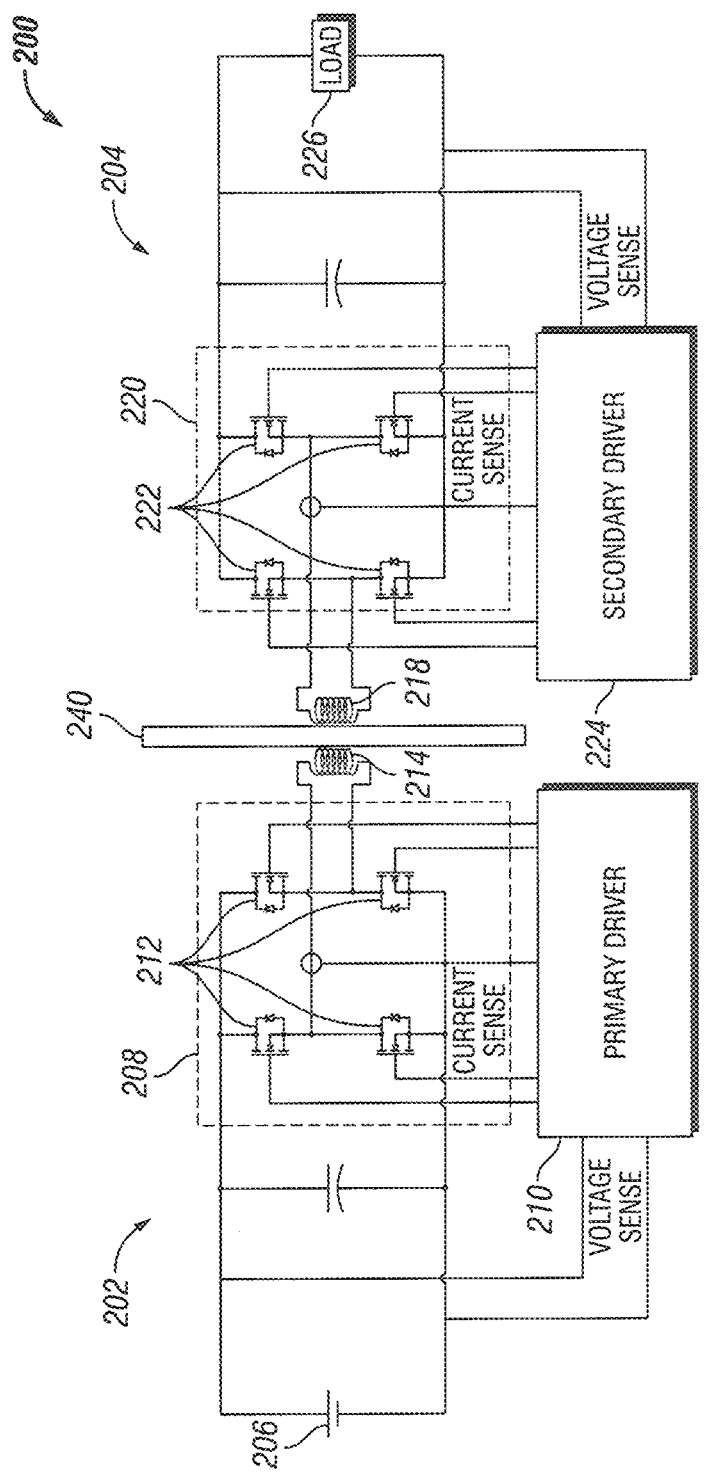
FIG. 2 illustrates a circuit diagram of a power transfer system, in accordance with example embodiments of the present disclosure.

FIG. 2 illustrates a circuit diagram of a power transfer system 200, in accordance with example embodiments of the present disclosure. The system 200 includes a primary side circuit 202 and a secondary side circuit 204. During use, the primary side circuit 202 and secondary side circuit 204 may be separated by a barrier 240 disposed therebetween. The primary side circuit 202 includes a transistor network 208, a primary coil 214, and a primary driver 210. The primary side circuit 202 is also coupled to a power supply 206. In some embodiments, the power supply 206 is a DC power supply. The primary coil 214 is configured to receive a primary rail voltage from the power supply 206 via the transistor network 208. As a result, a magnetic field is generated from a corresponding primary current flowing through the primary coil 214. In some embodiments, the transistor network 208 controls power delivery from the power supply 206 across the primary coil 214. In some embodiments, the transistor network 208 includes one or more transistors 212 or gates, such as a field-effect transistor (FET). In some embodiments, as illustrated in FIG. 1, the transistor network 208 forms an H-bridge.

In some embodiments, the transistor network 208 is controlled by the primary driver 210. Specifically, the primary driver 210 may include a processor, a waveform generator, and a pulse wave modulator, enabling the primary driver 210 to drive the transistor network 208 with a PWM signal, as illustrated and discussed with respect to FIG. 1. In some embodiments, the primary driver 210 senses the voltage and the current in the primary side circuit 202.

The secondary side circuit 204 includes a secondary coil 218, a secondary transistor network 220, a secondary driver 224, and a load 226. In some example applications, power is transferred from the primary side 102 to the secondary side 104 via inductive coupling across the first and second coils 214, 218. Specifically, the magnetic field generated by the primary coil 214 induces a secondary current in the secondary coil 218, which provides a voltage to the load 226 via the secondary transistor network 220. In some embodiments, the transistor network 220 can include one or more transistors 222 or gates and form various types of switches, rectifiers, and the like.

The secondary driver 224 provides a control scheme for controlling secondary transistor network 220. Specifically, the secondary driver 224 is configured to drive the transistor network 220 such that the current flowing across the secondary coil 218 is synchronized with the current flowing across the primary coil 214. Thus, the primary coil 214 and the secondary coil 218 generate opposing magnetic fields. As a result, the change in magnetic flux experienced by the barrier 240 is minimized and the Eddy current in the wall is minimized as well. This decreases the power loss across the barrier 240 and provides for more efficient power transfer from the primary side circuit 202 to the secondary side circuit 204, and ultimately from the power supply 206 to the load 226.

In some embodiments, the secondary driver 224 senses the current induced in the secondary coil 218 and generates a PWM signal for controlling the transistor network from the current. In some embodiments, the secondary driver 224 includes a current sense amplifier which senses the secondary current and is configured to generate a voltage signal from the secondary current. In some embodiments, the secondary driver 224 includes a phase-locked loop circuit which receives the voltage signal and phase-locks the voltage signal to the secondary current such that the phase of the voltage signal is kept the same as the phase of the secondary current. In some embodiments, the secondary driver 224 applies a phase shift and/or amplitude adjustment to the voltage signal based on the impedance of the load 226, which increases the efficiency of power transfer between the primary coil 214 and secondary coil 218. The resulting waveform is then modulated into a PWM signal and used to drive the secondary transistor network 220. In some embodiments, the secondary driver 224 is powered by the power delivered to the secondary side circuit 204 from the primary side circuit 202. Thus, the power transfer efficiency is relatively low when the secondary driver 224 is first being powered up. The power transfer efficiency then increases after the secondary driver 224 is fully powered and able to drive the transistor circuit 220. In some cases, the power transfer efficiency between the primary coil 214 and the secondary coil 218 can be increased from around 10% to around 60%.

Figure 3:
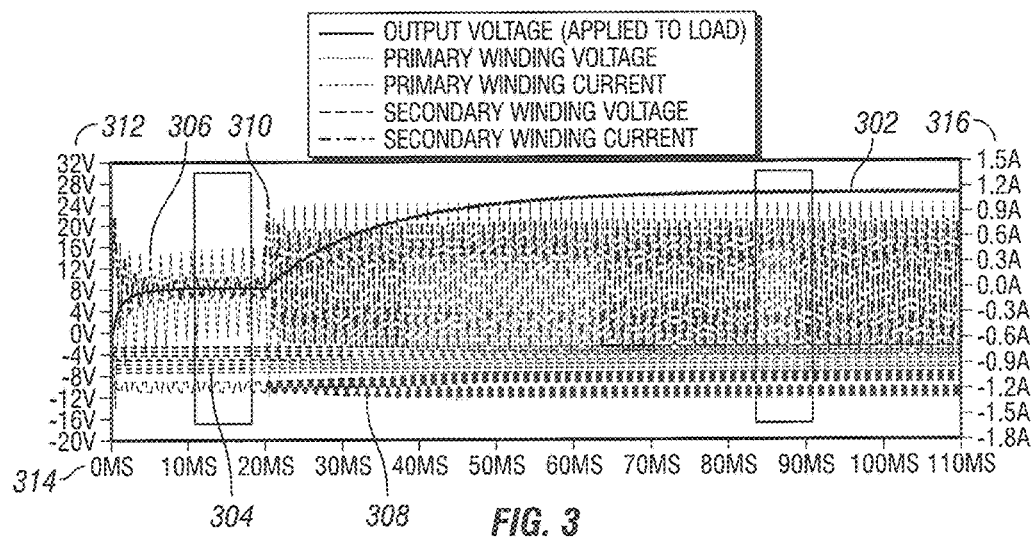
FIG. 3 is a plot illustrating various power parameters of a power transfer system, in accordance with example embodiments of the present disclosure.

FIG. 3 is a plot 300 illustrating various power parameters of a power transfer system, such as that illustrated in FIGS. 1 and 2, with respect to time, in accordance with example embodiments of the present disclosure. Specifically, the plot 300 illustrates an output voltage 302 as applied to the load, a primary side PWM voltage, a primary side current 306, a secondary side PWM voltage 308, and a secondary side current 310. The plot 300 further includes a voltage axis 312, an amperage axis 316, and a time axis 314. As shown, in this example, it takes approximately 20 ms for the secondary driver 224 to power up. Specifically, the output voltage 302 is much higher after the 20 ms mark, or the operational stage, than before the 20 ms mark, or the power up stage.

Figure 3A:
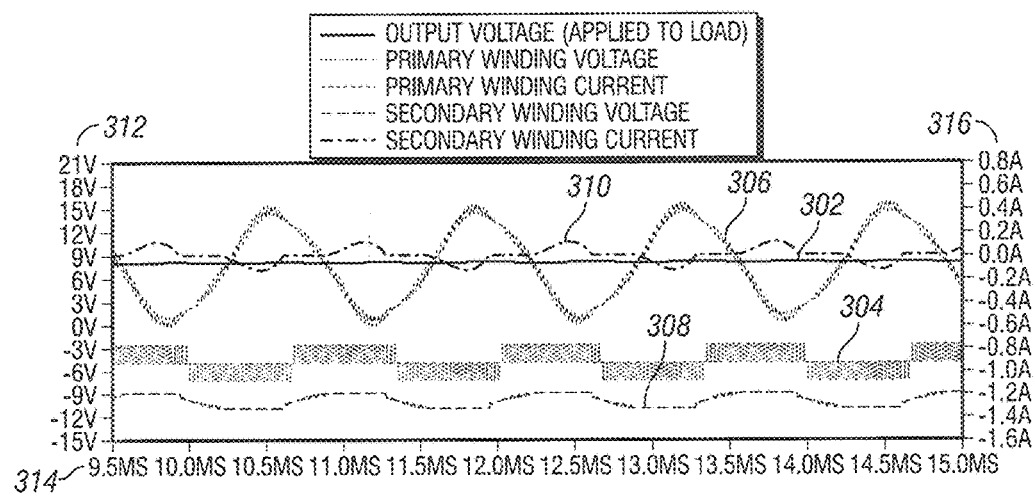
FIG. 3A illustrates a magnified view of a power up portion of FIG. 3, in accordance with example embodiments of the present disclosure.
Figure 3B:
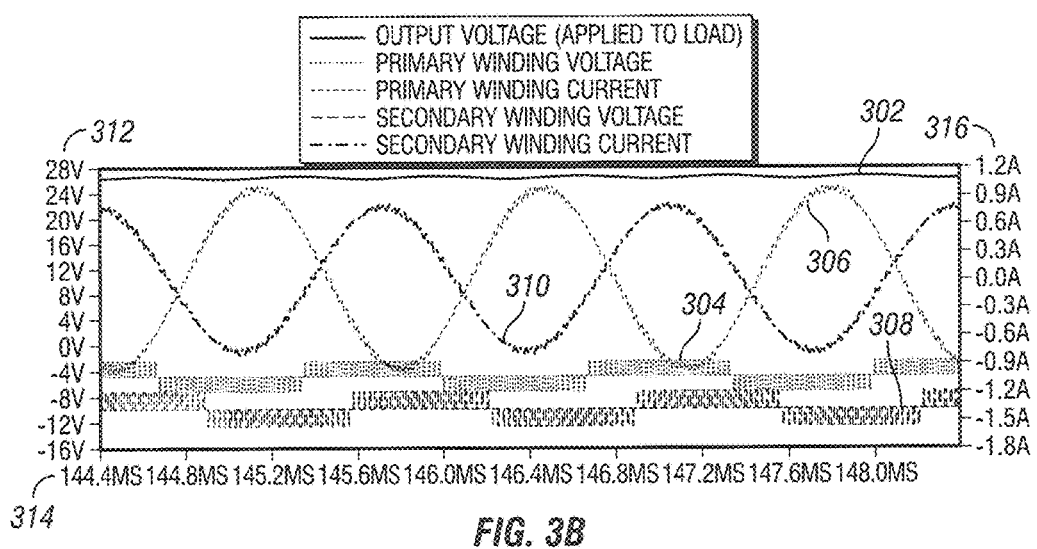
FIG. 3B illustrates a magnified view of an operational portion of FIG. 3, in accordance with example embodiments of the present disclosure.

FIG. 3A illustrates a magnified view of a portion of the power up stage of FIG. 3. In this stage, the secondary side current 310 is not a well-defined sinusoidal waveform and is very low compared to the primary side current 306, and there is no defined secondary side PWM voltage signal 308. The resulting output voltage is approximately 8V. FIG. 3B illustrates a magnified view of a portion of the operational stage of FIG. 3. In this state, the secondary driver 224 is fully powered and outputs the secondary side PWM signal 308. The secondary driver 224 actively drives the transistor network 220 with the secondary side PWM signal 308. Thus, the secondary side current 310 takes on a sinusoidal waveform that matches and/or is synchronized with the primary side current 306. In some embodiments, the secondary side current 310 is almost 180 degrees out of phase with the primary side current 306. The resulting DC output voltage 302 is approximately 26V, much higher than in the power up stage illustrated in FIG. 3A, signifying more efficient power transfer.

Figure 4A:
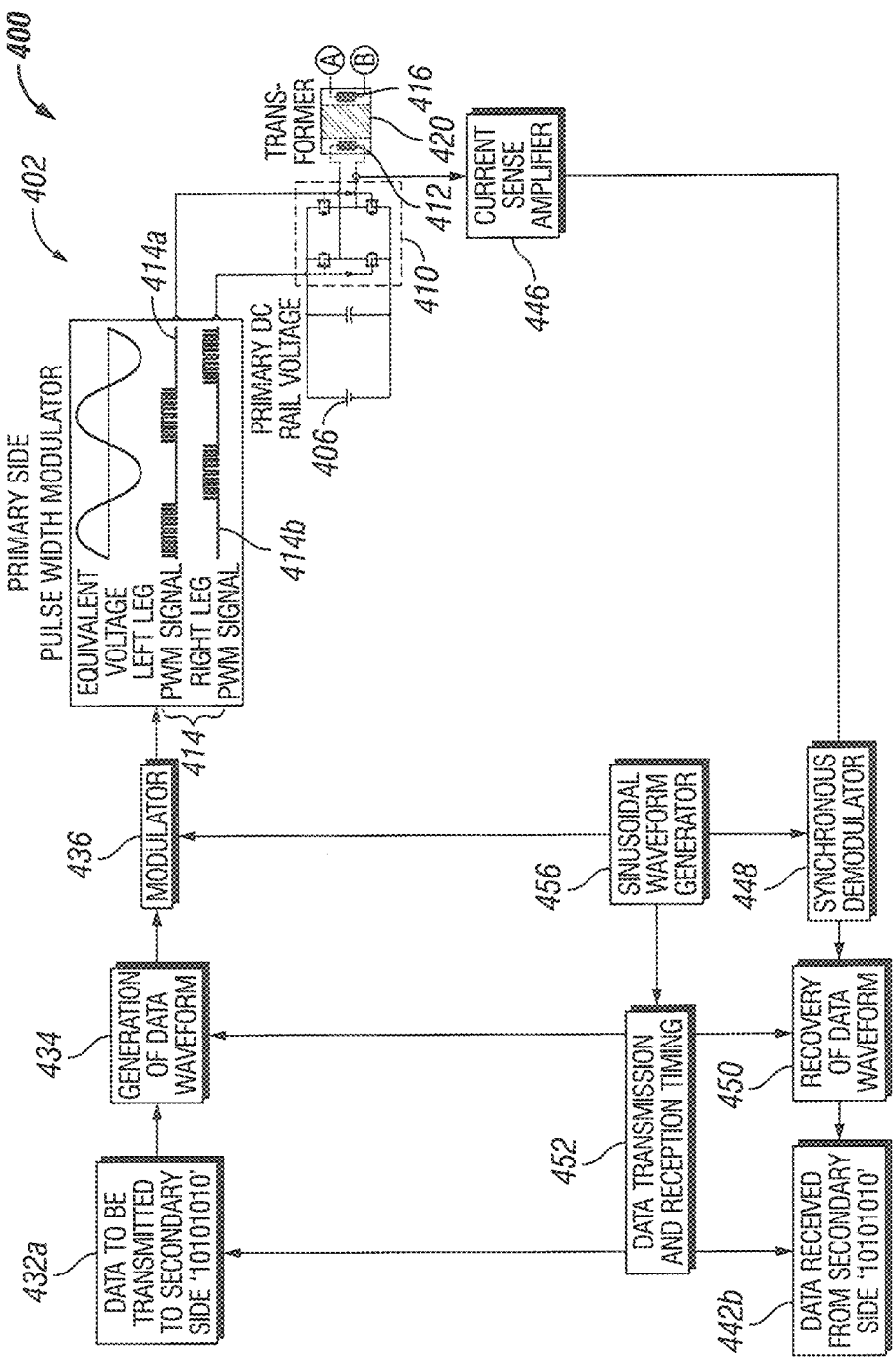
FIGS. 4A and 4B illustrate a schematic diagram of a power transfer system with bidirectional communication, in accordance with example embodiments of the present disclosure.
Figure 4B:
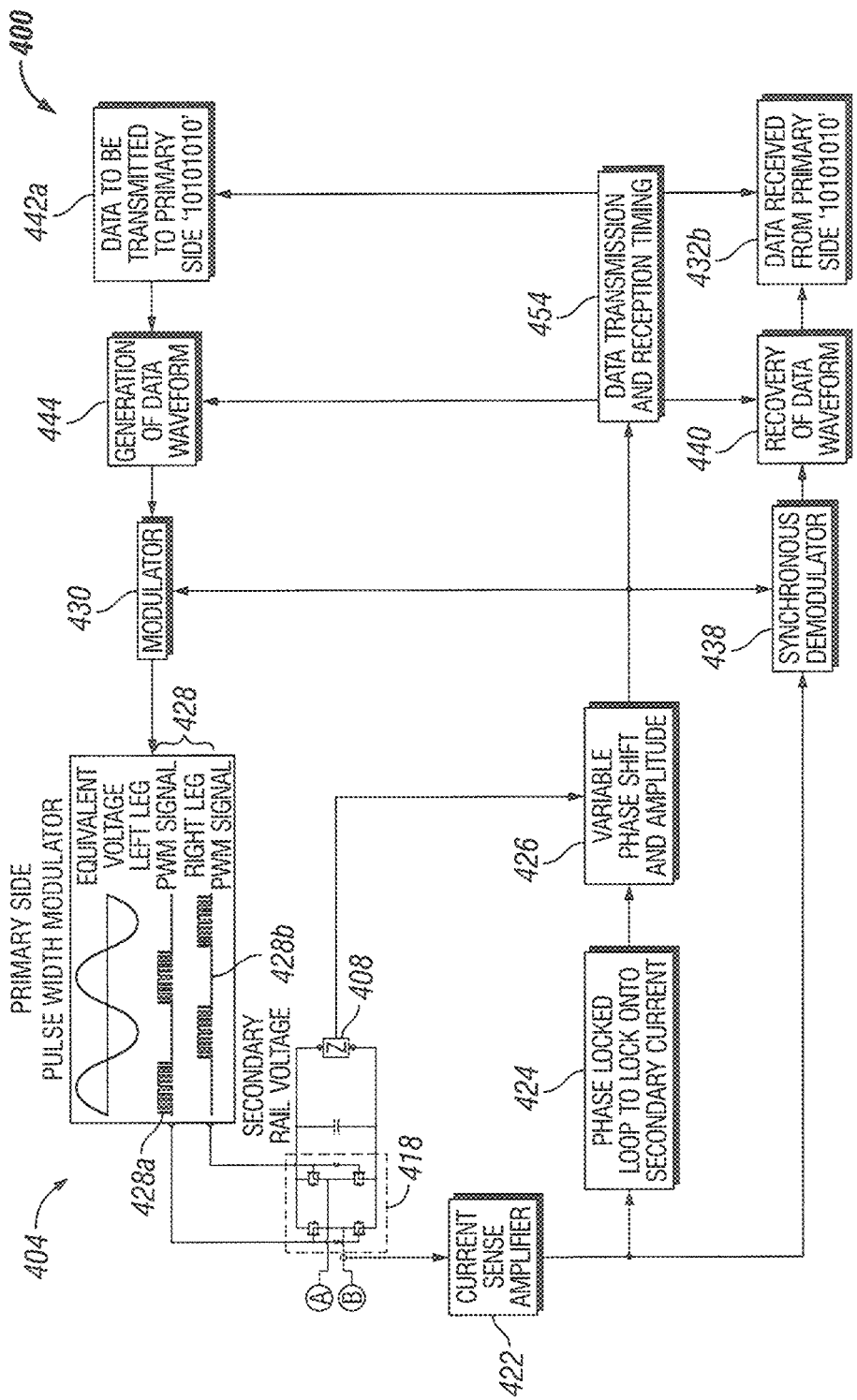

In addition to transmitting power wirelessly through a barrier, certain embodiments of the present disclosure also enable wireless communication through the barrier. FIGS. 4A and 4B, joined at points A and B, illustrate a schematic diagram of a power transfer system 400 with bidirectional communication, in accordance with example embodiments of the present disclosure. The power transfer aspects of the system 400 are very similar to the power transfer system 100 of FIG. 1. Specifically, the system 400 includes a primary side 402 and a secondary side 404, in which power is to be transmitted from the primary side 402, from a power supply 406 to the secondary side 404 to power a load 408 through inductive coupling. The primary side 402 includes a primary transistor network 410 and a primary coil 412. The power supply 406 provides a rail voltage to the primary coil 412 via the transistor network 410. In some embodiments, the transistor network 410 is driven by a PWM signal 414 which may include a left leg PWM signal 414a and a right leg PWM signal 414b. Thus, the a rail voltage is provided from the power supply 406 to the primary coil 412 based on the switching scheme of the transistor network 410 as determined by the PWM signal 414. A corresponding current flowing through the primary coil 412 generates a magnetic field.

The secondary side 404 includes a secondary coil 416, a secondary transistor network 418, and the load 408. In some example applications, power is to be transferred from the primary side 402 to the secondary side 404 through a barrier 420 disposed therebetween. Specifically, the magnetic field generated by the primary coil 412 induces a secondary current in the secondary coil 416. In some embodiments, the load 408 to receives a secondary rail voltage from the secondary coil 416 via the secondary transistor network 418. The load 408 may include any electronic components on the secondary side 104 which consume power, such as controllers, sensors, communication devices, and the like.

In some example embodiments, the secondary side 404 includes a current sense amplifier 422 which receives the secondary current, which generates a voltage signal from the secondary current. In some embodiments, the secondary side 404 further includes a phase-locked loop circuit 424 which receives the voltage signal and phase-locks the voltage signal to the secondary current such that the phase of the voltage signal is kept the same as the phase of the secondary current. In some embodiments, the secondary side 404 includes a phase shift and amplitude adjustment module 426 configured to apply a phase shift and/or amplitude adjustment to the voltage signal. In some embodiments, the phase shift and amplitude are adjusted based on the impedance of the load 408, which increases the efficiency of power transfer through the primary coil 412 and secondary coil 416.

In some embodiments, the secondary side 404 includes a modulator 430 which converts the adjusted voltage signal into a PWM signal 428 used to drive the secondary transistor network 418. Thus, the secondary side 404 is driven synchronously with the primary side 402, which maximizes power transfer efficiency between the primary side 402 and the secondary side 404 through the barrier 420. The power transfer aspects of the system 400 can include any or all of the features and embodiments described above with respect to FIGS. 1 and 2, some of which are not repeated for sake of brevity.

In addition to transmitting power wirelessly form the primary side 402 to the secondary side 404, data 432a can also be transmitted bidirectionally between the primary side 402 to the secondary side 404. In some embodiments, the primary side 402 further includes a data waveform generator 434 and a modulator 436, which together facilitate transmission of data from the primary side 402 to the secondary side 404. In some embodiments, the data 432a is originally in a binary form and may come from a controller or remote interface. In some embodiments, the data waveform generator 434 embeds the data 432a to be transmitted onto a waveform through, for example, amplitude modulation. The generated data-carrying waveform is then converted into a PWM signal through the modulator 436. The data-carrying PWM signal is then used to drive the primary transistor network 410 which controls delivery of voltage from the power supply 406 to the primary coil 412. Thus, the current induced in the secondary coil 416 carries the data.

With respect of receiving and obtaining data 432a transmitted from the primary side on the secondary side 404, the secondary side 404 includes a demodulator 438 and a data waveform recovery module 440. The demodulator 438 receives an output of the current sense amplifier 422 and demodulates the signal into a data waveform, from which a received data 432b is extracted by the data waveform recovery module 440. The data 432b is thus transmitted from the primary side 402 to the secondary side 404. The data 432b may include a control or request. In some embodiments, the demodulator 438 may be a synchronous demodulator.

Similarly, data 442a can be transmitted from the secondary side 404 to the primary side 402. The secondary side 404 includes a data waveform generator 444 which embeds the data 442a to be transmitted onto a waveform through, for example, amplitude modulation. The generated data-carrying waveform, along with the voltage signal obtained through the phase shift and amplitude adjustment module 426 are converted into a PWM signal through the modulator 436. Thus, the PWM signal includes the data 442a as well as a scheme for driving the secondary transistor network 418. The data 442a is thereby transmitted to the primary side 402 and driven onto the current on the primary side 402. The primary side 402 includes a current sense amplifier 446 which generates a corresponding voltage signal from the current, and a demodulator and data waveform recovery module which obtain a received data 442b from the voltage signal. Thus, the data 442a is transmitted from the secondary side 404 to the primary side 402, where it is received data 442b.

In certain embodiments, the primary side 402 and the secondary side 404 each includes a timing module 452, 454 configured to coordinate transmission and receipt of data. The primary side 402 also includes a sinusoidal waveform generator 456.

It should be noted that system modules such as the modulators 436, 430, demodulators 438, 448, data waveform generators 434, 444, data waveform recovery modules 450, 440, and timing modules 452, 454 represent functional aspects of the system 400, which may or may not be discrete hardware or software components. In practice, one or more of such modules can be implements in one or more processors through a combination of hardware and circuit components, and function-specific computer readable instructions stored in said hardware in order to carry out the novel techniques of the present disclosure. The example illustrations and descriptions of said functional aspects are used to express the technical essence of the present disclosure rather than to limit the present disclosure to the specific design choices of the examples used herein. Thus, such functional aspects can be illustrated and described in many different ways without leaving the scope and technical essence of the present disclosure.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

We claim:

1. A method of wireless power transfer, comprising:
   providing a primary rail voltage to a primary coil via a primary transistor network;
   driving the primary transistor network with a primary pulse-width modulation (PWM) signal;
   inducing a secondary current on a secondary coil;
   providing a secondary rail voltage to a load via a secondary transistor network;
   generating a voltage signal from the secondary current via a current sense amplifier;
   phase-locking the voltage signal to the secondary current;
   adjusting a phase shift and amplitude of the voltage signal based on the impedance of the load, thereby generating a driving voltage;
   converting the driving voltage to a secondary PWM signal; and
   driving the secondary transistor network with the PWM signal, wherein a barrier is disposed between the primary coil and the secondary coil, and wherein the primary coil generates a primary flux in the barrier and the secondary coil is driven by the secondary rail voltage to generate a secondary flux in the barrier that cancels out at least a portion of the primary flux.

2. The method of claim 1, wherein the primary transistor network is an H-bridge.

3. The method of claim 1, wherein the secondary transistor network is a full-wave rectifier.

4. The method of claim 1, wherein the secondary current is between 0 degrees and 180 degrees out of phase with the primary current.

5. The method of claim 1, further comprising at least one of:
   encoding a primary communication signal onto the primary PWM signal; and encoding a secondary communication signal onto the secondary PWM signal.

6. The method of claim 5, comprising at least one of:
encoding the primary communication through amplitude modulation; and
encoding the secondary communication signal through amplitude modulation.

7. The method of claim 5, further comprising at least one of:
decoding the primary communication signal; and
decoding the secondary communication signal.

8. The method of claim 1, further comprising providing a power transfer efficiency between the primary coil and the secondary coil greater than 10% and up to approximately 60%.

9. A wireless power transfer system, comprising:
a primary side, comprising:
a primary coil configured to receive a primary rail voltage from a power supply via a primary transistor network and generate a magnetic field from a primary current; and
a primary driver configured to drive the primary transistor network with a primary pulse-width modulation (PWM) signal; and
a secondary side, comprising:
a secondary coil configured to generate a secondary current from the magnetic field;
a load configured to receive a secondary rail voltage from the secondary coil via a secondary transistor network;
a current sense amplifier configured to generate a voltage signal from the secondary current;
a phase locked loop circuit configured to phase-lock the voltage signal to the secondary current, generating a driving voltage; and
a secondary driver configured to convert the driving voltage to a secondary PWM signal and drive the secondary transistor network with the secondary PWM signal, wherein the primary coil generates a primary flux in a barrier disposed between the primary coil and the secondary coil, and the secondary coil is driven to generate a secondary flux in the barrier, and wherein the secondary flux cancels out at least a portion of the primary flux.

10. The system of claim 9, wherein the primary coil and the secondary coil are disposed on opposite sides of a barrier.

11. The system of claim 9, wherein the secondary driver has a power-up delay, and wherein power delivered to the load increases after the secondary driver is powered up.

12. The system of claim 9, wherein the primary current and the secondary current are synchronized.

13. The system of claim 9, wherein the secondary current is between 0 degrees and 180 degrees out of phase with the primary current.

14. The system of claim 9, wherein a power transfer efficiency between the primary side and the secondary side is greater than 10% and up to approximately 60%.

15. A wireless power transfer system with bidirectional communication, comprising:

a power supply;
a primary side comprising:
a primary driver;
a primary transistor network drivable by the primary driver with a primary pulse-width modulation (PWM) signal;
a primary coil electrically coupled to the power supply via the primary transistor network, the primary coil configured to generate a magnetic field when a primary current is induced therein; and
a primary data encoder configured to encode a primary data onto the primary PWM signal; and
a secondary side comprising:
a secondary coil in which a secondary current is induced from the magnetic field;
a secondary transistor network electrically coupled to the secondary coil;
a load to which a secondary rail voltage from the secondary coil is delivered via the secondary transistor network;
a current sense amplifier electrically coupled to the secondary coil so as to receive the secondary current and generate a voltage signal;
a phase locked loop circuit electrically coupled to the current sense amplifier so as to be configured to phase-lock the voltage signal to the secondary current and generate a driving voltage;
a secondary driver configured to convert the driving voltage to a secondary PWM signal and drive the secondary transistor network with the secondary PWM signal; and
a secondary data decoder coupled to the current sense amplifier so as to be configured to extract the primary data from the primary PWM signal transmitted from the primary side, wherein the primary coil generates a primary flux in the barrier and the secondary coil is driven to generate a secondary flux in the barrier, and wherein the secondary flux cancels out at least a portion of the primary flux.

16. The system of claim 15, further comprising:
a secondary data encoder configured to encode a secondary data onto the secondary PWM signal for transmission from the secondary side to the primary side; and
a primary data decoder configured to extract the secondary data from the primary PWM signal transmitted from the secondary side to the primary side.

17. The system of claim 16, wherein the primary and secondary data encoders each comprise a data waveform generator, modulator, or both, and wherein the primary and secondary decoders each comprise a demodulator, a data waveform recovery module, or both.

18. The system of claim 16, wherein the primary data and secondary data are encoded through amplitude modulation.

19. The system of claim 15, wherein the primary current and the secondary current are synchronized.

20. The system of claim 15, wherein the secondary current is between 0 degrees and 180 degrees out of phase with the primary current.

* * * * *